April 25, 1933.  G. C. JETT  1,905,231

BRAKE MECHANISM

Filed Aug. 23, 1928   5 Sheets-Sheet 2

Inventor:
George C. Jett
By: Ira J. Wilson
Atty.

April 25, 1933.  G. C. JETT  1,905,231
BRAKE MECHANISM
Filed Aug. 23, 1928  5 Sheets-Sheet 4

Inventor:
George C. Jett
By: Ira J. Wilson
Atty.

Patented Apr. 25, 1933

1,905,231

UNITED STATES PATENT OFFICE

GEORGE C. JETT, OF MILWAUKEE, WISCONSIN, ASSIGNOR OF TWO-FIFTHS TO WALTER H. STIEMKE, OF MILWAUKEE, WISCONSIN

BRAKE MECHANISM

Application filed August 23, 1928. Serial No. 301,454.

This invention relates to brake mechanisms in general and has characteristics which suit it particularly well to internal expanding brakes which may be inclosed in dust proof covers.

This invention has been evolved principally to serve the braking requirements in crawler tractors but it will be observed that many of the features which are particularly useful in tractor braking will also be found especially advantageous for use with equipment other than tractors. Crawler tractors are customarily at present steered by means of applying a braking force to the rear creeper sprocket on either side to cause the creeper on that side to slow down while the opposite creeper continues at a higher rate of speed. The application of braking means to the rear sprocket usually involves serious mechanical problems since the rear creeper sprocket is usually the sprocket which drives the creeper. This invention makes it very practical and simple to apply the braking force to the front creeper sprocket and the construction of the braking means not only provides the first practical braking apparatus for a front creeper sprocket but it also provides a number of new advantages never before possessed by any braking mechanisms known to the present time. These new advantages will be described hereinafter.

One of the objects of this invention is to provide a braking mechanism which may be housed within a dust proof inclosure yet perfectly operated and controlled by actuating means located outside of the dust proof inclosure.

Another object of this invention is to provide in a braking mechanism a brake band which is adapted to float freely out of contact with the corresponding brake drum when in inoperative position and yet which can be applied to the brake drum with full effectiveness throughout its entire length.

Another object of this invention is to provide a braking mechanism for a rotatable wheel which will supply a braking force which is equally effective in either direction of rotation of the wheel.

Another object of this invention is to provide a braking mechanism of the internal expanding type and a dust proof inclosure therefor which will efficiently seal the mechanism against the intrusion of dust and yet may be easily removed for inspection and adjustment of the braking mechanism.

Another object of this invention is to provide a braking mechanism having a brake band which is rotatable when in inoperative position but which is held against rotation when in operative position.

Another object of this invention is to provide a braking mechanism for a rotatable wheel together with means for mounting the wheel in adjustable positions, the braking mechanism being adapted to be carried along with the wheel into the several positions without disturbance of the alignment of the braking mechanism.

Another object of this invention is to provide a braking mechanism which can be operated with a small amount of manual force but which will produce relatively great braking power without introducing complexity of construction or sacrificing speed of application.

Other objects, advantages and capabilities are inherently possessed by this invention and will later become apparent. In the drawings this braking mechanism is shown as applied to a crawler type tractor and two operating mechanisms are shown, one being hydraulic operation and the other full mechanical operation.

Fig. 4 is a section taken approximately on the irregular line 4—4 of Fig. 2.

Figure 1:
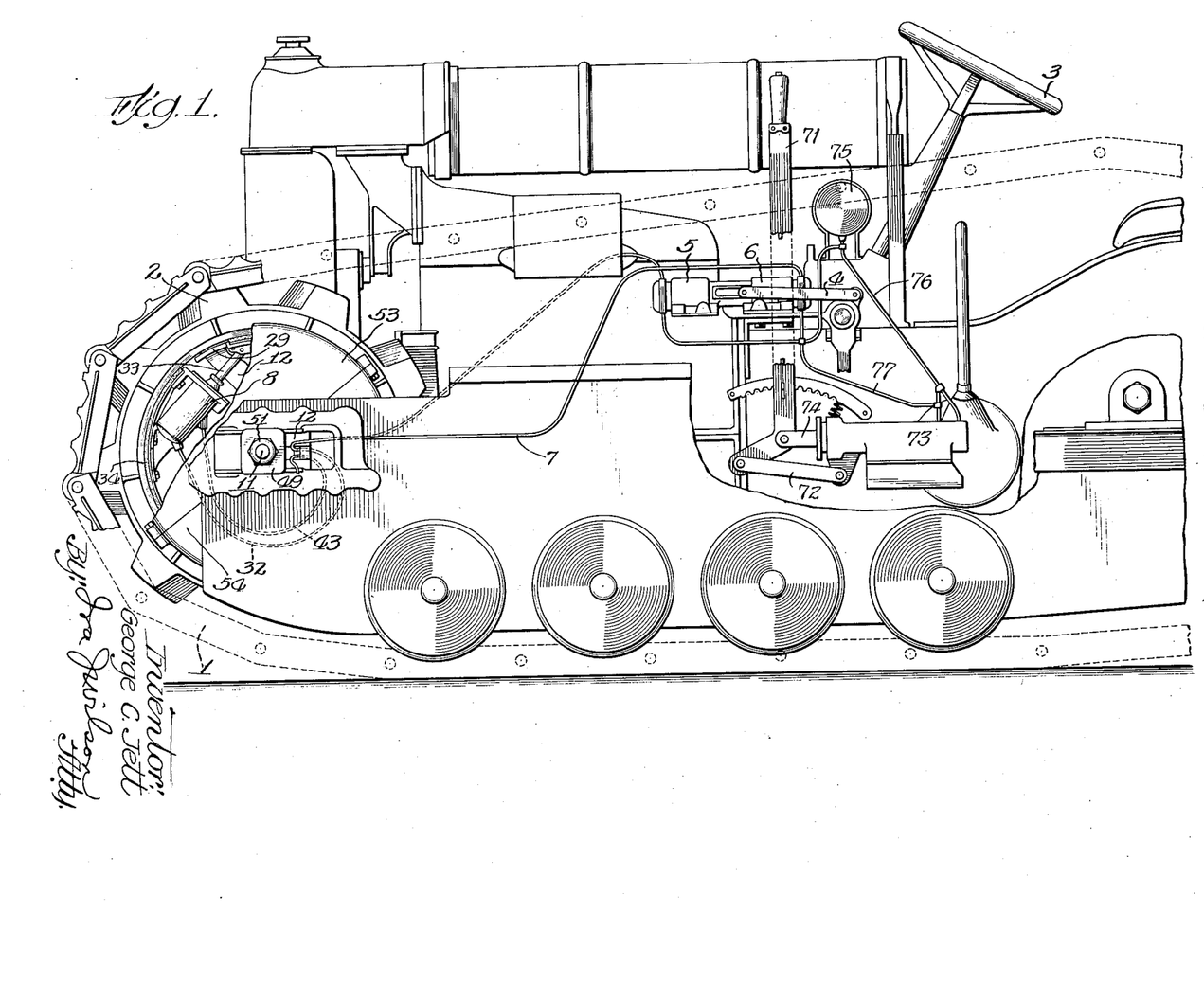
Fig. 1 shows this new braking mechanism hydraulically operated and applied to a crawler tractor.

Referring now in greater detail to the drawings, a tractor is illustrated in Fig. 1 which has the endless creeper 1 which passes over the front creeper sprocket 2. The rear driving sprocket need not be shown as it has no bearing on the disclosure of this invention. The braking mechanism is not only intended to perform the usual braking service to regulate the speed of the tractor but it also, by causing one creeper to move more slowly than the other, enables one to steer a tractor of this type. To this end a hand wheel 3 is utilized by the operator in steering the tractor. When this hand wheel is rotated in one direction a suitable gear, not shown, located on the lower end of the hand wheel shaft will cause the link 4 to be reciprocated and this link will cause the reciprocation of pistons in the cylinders 5 and 6. The internal construction of these cylinders need not be here shown for the disclosure of the braking mechanism invention but is merely referred to in this manner to explain the hydraulic operation of the more fully described braking mechanism. The lever 71 is connected by a pivoted link 72 to a cylinder casing 73 and when manually operated will reciprocate a plunger 74 connected to a piston in the cylinder casing for pumping oil from the reservoir 75 through pipe 76 and pipe 77 into the cylinders 5 and 6 and the conduit 7. This lever, while used for pumping oil into the brake system to put the same in operative condition, is also used as an emergency brake. However, a further description of the last-mentioned feature is unnecessary here to a clear understanding of the invention described in his application. The reciprocation of the piston in the cylinder 6 in a right hand direction as shown in the drawings is adapted to place hydraulic pressure on the fluid contained within the pipe 7 and the pressure will be thus transmitted to the interior of the cylinder 8 which will cause the piston 9 to expand the internal brake band thus causing the front creeper sprocket here shown to be retarded and causing the tractor to turn under the influence of the power which is being applied to the other creeper which is not retarded. With this explanation it is obvious that a rotation of the hand wheel 3 in the reverse direction should cause the link 4 to reciprocate toward the left side to release the hydraulic pressure from the brake band shown in Fig. 1 and to apply hydraulic pressure to the brake band on the opposite front creeper sprocket. The foregoing brief description of the method of steering will suffice to illustrate one of the important uses of this braking mechanism.

Hitherto in mounting a flexible brake band so that it may be applied with braking force against a rotating brake drum it has been customary to permanently anchor one end of the brake band in order to prevent the entire band from gripping the brake drum and rotating therewith when being operated. But in providing against the rotation of the brake band, prior constructors have produced braking mechanisms which function with maximum efficiency only when the brake drum rotates in one direction and which function with very reduced efficiency when the brake drum rotates in the opposite direction. Referring to a brake band of the type shown in the drawings and which may be called a transplit brake band the anchored end will have no circumferential motion. The free end may be moved somewhat radially outwardly and to some extent in a circumferential direction to expand the band where the band is of the expanding type or to contract it in cases where the brake band contracts upon the external surface of the drum. If the same end is always anchored there will not only be difficulty in causing that end of the brake band to approach the brake drum and grip it properly but the brake band can function with good efficiency only when the brake drum is rotating toward the anchored end in the case of internal brakes and toward the free end in the case of external brakes. Whenever a brake mechanism having the same brake band end always anchored is rotating in a direction reverse to the directions above stated the brake drum will tend to throw off the brake band and very little braking efficiency can be obtained and none at all can be obtained excepting with the application of an excessive amount of brake operating power. This invention provides a brake construction in which neither brake band end is permanently anchored, in which one end or the other is selectively anchored depending on the rotation of the brake drum. The selection of the end which is to be anchored is made so that a slight amount of brake operating power will suffice to insure tremendous frictional engagement of the band and drum and consequent maximum efficiency in braking.

Figure 2:
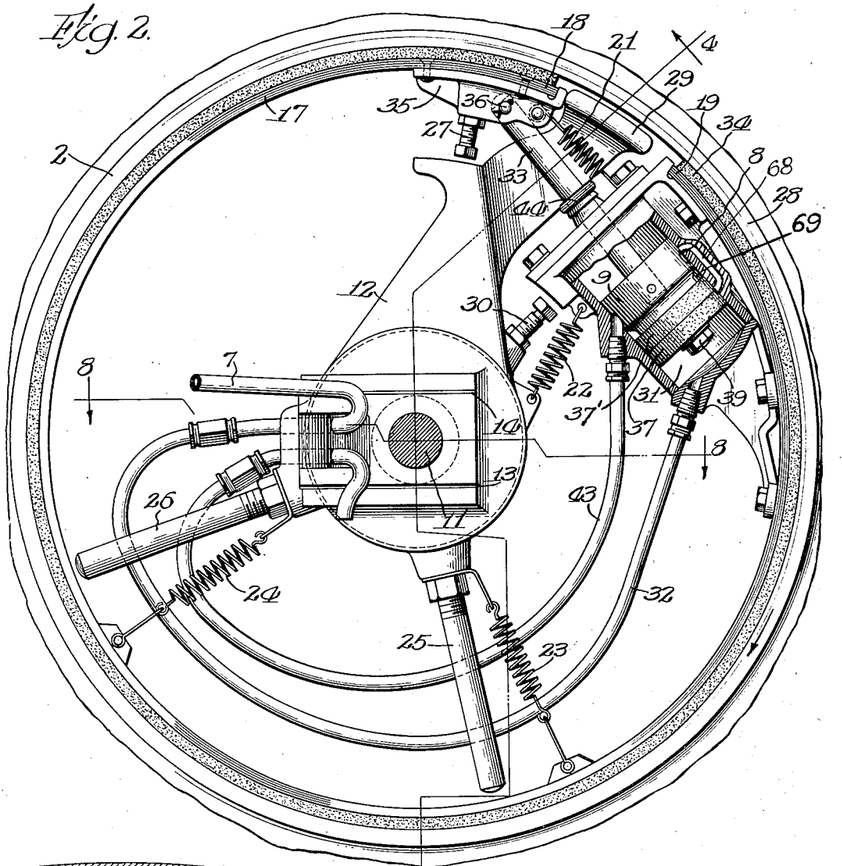
Fig. 2 shows in detail the hydraulic operating means and the brake construction with appropriate portions shown in cross section.
Figure 9:
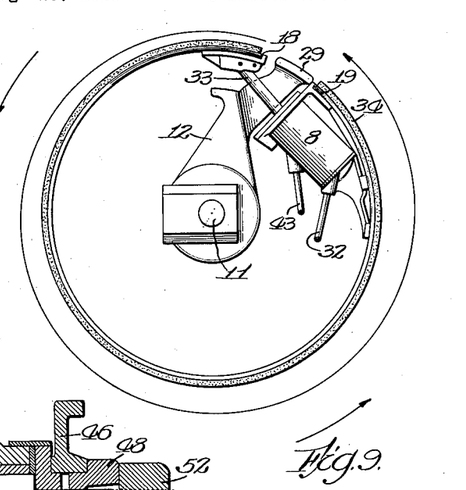
Fig. 9 is a schematic showing of the pressure conditions produced by this braking mechanism when the brake drum is rotating in a counter-clockwise direction.
Figure 10:
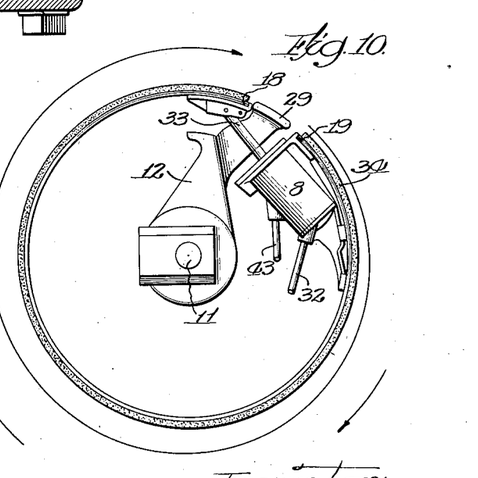
Fig. 10 is a schematic showing of the pressure conditions when the brake drum is rotating in a clockwise direction.

The foregoing described braking efficiencies are obtained by the construction which is well illustrated in Figs. 2, 9 and 10. The creeper sprocket 2 rotates about an axle 11. Fitted over the axle 11 is a torque arm 12 which has flat faces 13 and 14 which are adapted to slidably engage with the frame members 15 and 16 which constitute a part of the tractor frame or other vehicle or machine on which this rotatable wheel or sprocket may be mounted. The long flat faces 13 and 14 of the torque arm 12 by their engagement with the frame will prevent this torque arm from rotating although it is apparent that the torque arm may be moved horizontally between the parallel frame members and clamped in any one of several positions by clamping means which will later be described.

This torque arm performs several functions in the mechanism. The brake band 17 preferably made of a flexible metal has its two ends 18 and 19 normally drawn together by means of the spiral spring 21. The contracted brake band when in operative position is further urged away from the drum by the contraction of the springs 22, 23 and 24 each of which springs is attached to the torque arm in some suitable manner, for example, as shown. In order to prevent the brake band from contracting too much the studs 25 and 26 are mounted on the torque arm. Their outer ends will abut against the brake band to prevent excessive contraction while the stud 27 is attached directly to the brake band and will itself abut against the torque arm to hold the brake band against excessive contraction and properly centered when in its inoperative position.

When the brake drum is rotating the torque arm serves another purpose. It is apparent that if the brake drum 28 be rotating in a clockwise direction as shown in Fig. 2 and Fig. 10 the brake band when expanded will grip the drum and be rotated therewith until the brake band end 18 abuts against the stop 29 at the outer extremity of the torque arm. As soon as this end abuts against the stop this end 18 becomes the anchored end of the brake band and the opposite end which is free may be further rotated by the brake operating means to cause the further expansion of the brake band. The frictional engagement of the band and drum will not tend to throw the band away from the drum but in fact will tend to cause them to engage even more firmly and the friction between the brake band and drum will increase progressively from the free end toward the anchored end. This increase of pressure from the free end toward the anchored end is indicated schematically by the increasing diameter of the curved dash line shown outside of the brake drum in Fig. 10. When the brake operating power is released the springs 21, 22, 23 and 24 will promptly contract the brake band and disengage it from the brake drum, restoring the brake band to normal contracted position. If desired the spring 21 can be made strong enough to cause both ends of the brake band to contract against the stop 29 when the brake band is in inoperative position to prevent any rattling of the brake band.

Fig. 9 shows how the torque arm resists rotation of the brake band when the brake drum is rotating in a counter-clockwise direction. In this case the brake band end 19 becomes anchored against the torque arm stop and the brake band end 18 becomes the free end. The frictional engagement of the band and drum will increase as before from the free end toward the anchored end but in this instance from the end 18 toward the anchored end 19. Due to the fact that the rotation of the drum determines which end of the band will be anchored equal maximum braking efficiency will be obtained when the brake drum is rotating in either direction. This characteristic of this invention may be contrasted with the prior braking mechanisms which were adapted to yield good braking only when the brake drum rotated in one direction. For example, many automobile brakes would hold the automobiles from traveling forwardly but were very inefficient in preventing rearward travel of the automobiles.

Figure 3:
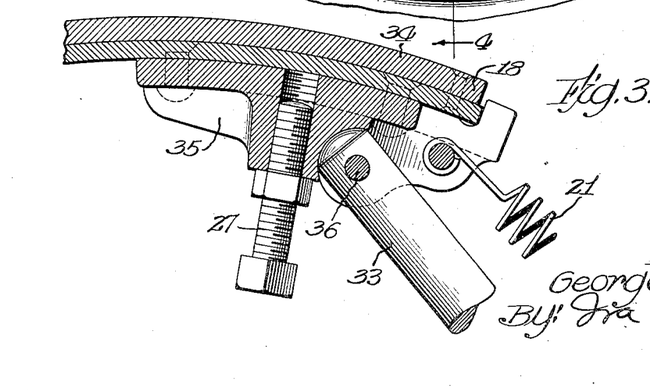
Fig. 3 is a detail view showing the method of securing the connecting rod to one of the brake band ends.
Figures 5, 6, 7, 8:
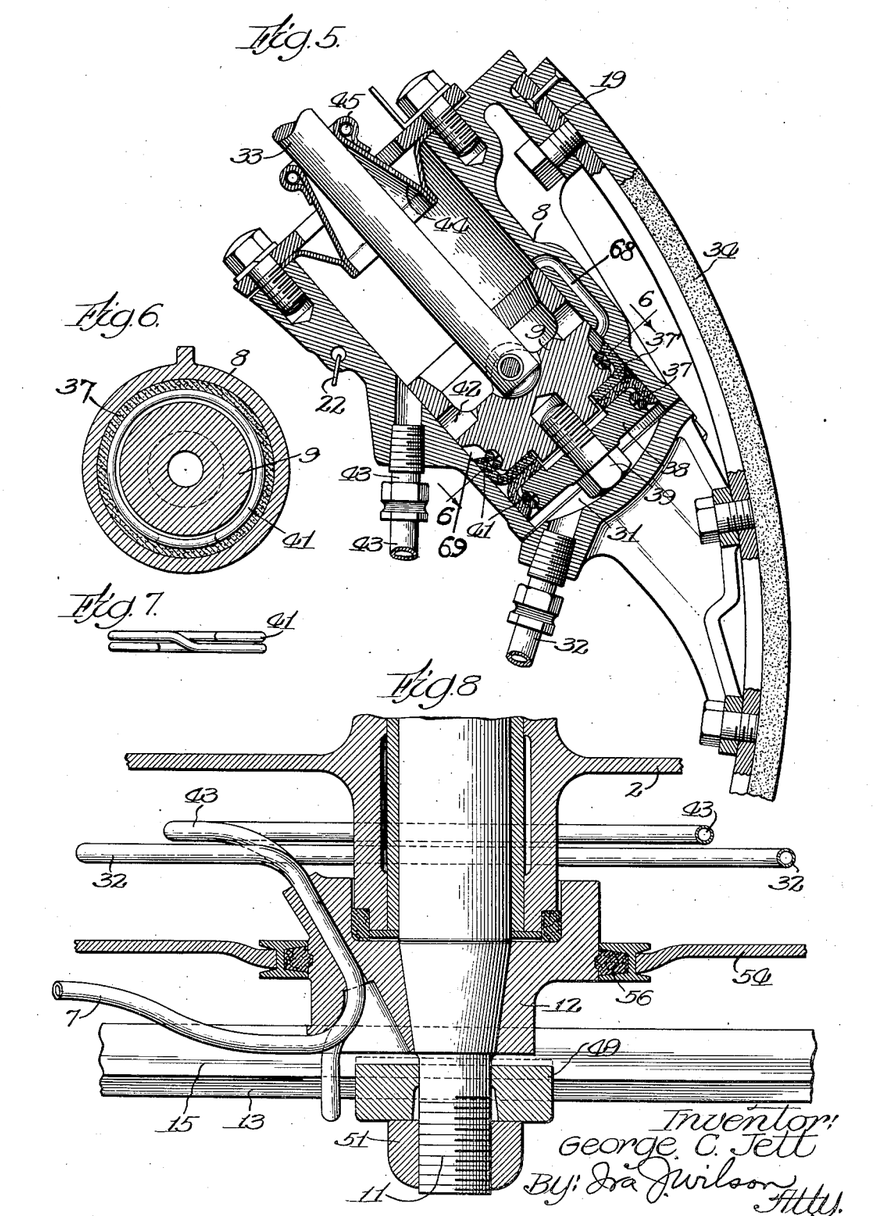
Fig. 5 is a central longitudinal sectional view of the cylinder shown in Fig. 2.
Fig. 6 is a cross sectional view on the line 6—6 of Fig. 5.
Fig. 7 is an elevation of the coiled spring shown in Fig. 5 which urges the fibrous cups outwardly against the cylinder walls.
Fig. 8 is a section as viewed downwardly on the line 8—8 of Fig. 2.
Figures 11, 12:
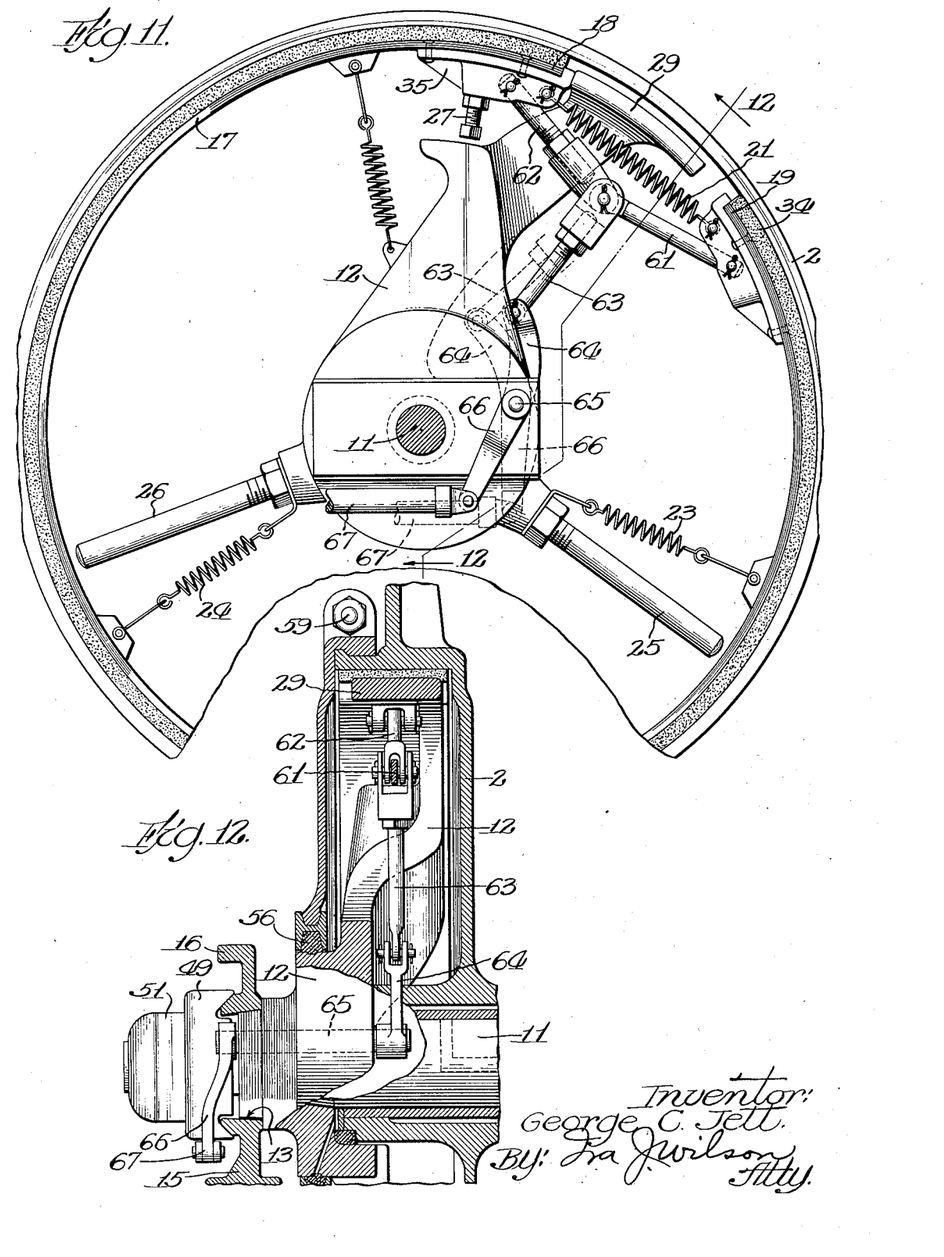
Fig. 11 shows the same type of brake band as is shown in the previous figures but shows a mechanical operating means instead of a hydraulic operating means.
Fig. 12 is a sectional view on the line 12—12 of Fig. 11.

The brake operating means may be either the hydraulic mechanism shown in Fig. 2 or the mechanical mechanism shown in Fig. 11. In Fig. 2 there is shown a cylinder 8 in which the piston 9 reciprocates. A compression chamber 31 is located on the compression side of the piston into which a fluid such as oil, for example, may be forced through the compression pipe 32. This pipe 32 is concealed entirely within the brake housing and is connected externally with the pipe 7 shown in Fig. 1. An increase of compression in the compression chamber will cause the piston to force the connecting rod 33 away from the cylinder thus spreading the brake band ends away from each other due to the fact that the cylinder itself is rigidly secured to the brake band end 19 by suitable plates and bolts as illustrated in Figs. 2 and 5. These securing bolts will not, of course, extend through the brake band lining 34. The outer end of the connecting rod 33 is fastened to the brake band end 18 by means of a connecting plate 35, shown in detail in Fig. 3, and a pin 36. In order to provide a strong and efficient connection the end of the rod may be spherically rounded as shown in Fig. 3 so that it may seat in a corresponding rounded socket in the plate 35. The stud 27 shown in Fig. 3 is merely a spacing stud to abut against the torque arm and prevent too great contraction of the brake band. This stud, like the other spacing studs 25, 26 and 30, may be adjusted as is obvious from their construction.

The hydraulic brake operating means is designed with meticulous care to make it trouble proof and positive in operation. As shown in Fig. 5 the piston itself is comprised of several assembled parts. Two fibrous cups 37 and 37', which may be of leather or other suitable material, are clamped into position by the plate 38 and the bolt 39 and their flange portions are urged tightly against the cylinder walls by the coiled springs 41 which are disposed within the flanges. These coiled springs are particularly illustrated in Figs. 5 and 7 and are adapted to give a maximum expansive force with uniform effect in a small space. These fibrous cups will form a very tight seal which will make possible the obtaining and maintaining of high pressures in the compression chamber of this cylinder. The nature of the fibrous material is suitable for such use as no substantial amount of heat will ever be present in this cylinder.

Furthermore should an excessive amount of oil, more than is needed for lubrication, pass beyond the sealing cups it will collect on the low pressure side of the piston and find its way through the channel 42, thence into the overflow pipe 43 which, as is shown in Figs. 1 and 2, will carry this overflow oil outside of the brake mechanism housing and discharge it onto the ground. As a further precaution a boot 44 surrounds the connecting rod 33 and is maintained in sealing contact with the connecting rod by a spring 45, thus preventing escape of oil from the cylinder except by way of the overflow and also guarding against the intrusion of dust into the cylinder.

It will be noted that the connecting rod and cylinder are carried and supported on the brake band and are not directly supported on the wheel or framework, thus making it possible for this band to be maintained in a free floating position and making each end capable of a small amount of independent circumferential rotation. Though the band freely floats when in the inoperative position yet when compression is placed upon the oil or other fluid in the pipe 32 by means of the hand wheel 3, as heretofore described, the band will be immediately expanded into a positive frictional grip on the brake drum and the torque arm will limit the rotative movement of one end of the band while the other is moved to increase the expansion of the brake band.

In the mounting of the wheel upon the frame special advantages are sought and obtained which pertain particularly to the use of this mechanism on the front creeper sprocket of a tractor. Such a sprocket must be capable of longitudinal adjustment in order to take up wear in the creeper. This sprocket is therefore mounted between a pair of parallel outside beams 15 and 16 and parallel inside beams 46 and 47. The inner end of the wheel axle is mounted in a supporting member 48 which is slidably disposed between the parallel beams 46 and 47. The outer end of the axle is fitted into the outer portion of the torque arm and the torque arm itself has longitudinal bearing surfaces 13 and 14 which are slidably disposed between the parallel beams 15 and 16. By means of the clamping collar 49 and the clamping nuts 51 and 52 this sprocket may be firmly secured in any desired position along its supporting beams. The manner of attaching the beams to the framework is not a material part of this invention.

While the front creeper sprocket should be adjustable longitudinally this adjustment should not disturb the setting of the braking mechanism and provision against this is provided by making this torque arm which carries the brake band movable integrally with the axle. This torque arm also provides a channel through which the compressed fluid may be introduced to the cylinder, that is, by means of the compression pipes 7 and 32. This pipe is brought in at one side of the axle as is illustrated in Figs. 2 and 8. At the same time this torque arm provides a channel through which the overflow pipe 43 may protrude. The slight longitudinal adjustment of the sprocket wheel which may be necessary from time to time will not disturb the connection of the hydraulic cylinder to the hydraulic pump which is operated by the hand wheel inasmuch as the curved compression pipe 7 will, through its curvature, take up the play.

A dust proof inclosure for this braking mechanism is supplied by securing a cover split into two sections 53 and 54 as is shown in Figs. 1 and 4. These sections are clamped securely to the outer surface of a brake drum as shown in Fig. 4 and provide when assembled a central opening in which an H-shaped ring 55 is mounted. Inside of the H-shaped ring is a felt washer 56 which furnishes an efficient dust seal as it rotates about the circular boss of the torque arm. A small amount of lubrication is provided through the channel 57 to this felt washer. This split cover may be removed easily by unfastening the clamping bolts 58 and 59 and lifting these sections off from the H ring 55. The entire brake mechanism which was previously sealed within a dust proof inclosure will then be vailable for inspection or adjustment.

A modified brake band operating means is shown in Figs. 11 and 12. Instead of the hydraulic cylinder and piston a toggle having the links 61, 62 and 63 is provided. This toggle is expanded or contracted by the rotation of a crank arm having an inner crank member 64 which is located within the dust proof inclosure, an axis 65 which extends through the torque arm to the exterior of the dust proof inclosure and an outer crank arm member 66. At the outer end of this crank arm an actuating rod 67 is connected and this rod may be reciprocated from the driver's seat by any suitable link mechanism not herein shown. The mechanical brake band operating means permits the brake band to be mounted in a freely floating position when it is not in contact with the brake drum just as was the case with the hydraulic operating means and likewise permits either end of the brake band to drift into contact with the sides of the torque arm stop 29. As the torque arm, shown in Fig. 11, moves with the axle during longitudinal adjustment of the front sprocket wheel the alignment of the brake mechanism need not be disturbed.

In order that the cylinder 8 may be filled with oil, the connecting rod 33 should be disconnected from the end 18 of the brake band. This is done by removing the cotter pin and the connecting pin 36, which are shown in Fig. 2. With the end of the connecting rod free, the piston may be withdrawn in the cylinder 8 until the face of the piston has been drawn back slightly past the inner end of the passage 68. With the piston held in this position, the outer end of the passage 68 will register with the annular groove 69 which is provided, while the inner end of the duct 68 will register with the interior of the compression chamber 31. At the same time the annular groove 69 will also be registering with the inner end of the overflow pipe 43. There is thus established continuous communication between the compression chamber and the overflow pipe. Oil is then pumped into the cylinder compression chamber 31 through the pipe 32 by any suitable force. As the oil gradually fills the lower part of the compression chamber, the air remaining within the compression chamber will be forced out through the passage 68, thence through the annular groove 69 into the overflow pipe 43. The pumping of oil will continue until all of the air is driven out of the compression chamber and until the oil flows through the duct 68 through the annular groove 69, and fills the pipe 43 to the point where some oil will be caused to overflow through the outer end of the pipe 43. This overflow oil will be discharged outside of the brake mechanism housing. When sufficient oil has been pumped, as is indicated by its ejection from the overflow pipe, the pumping will be stopped and the piston will be thrust inwardly again by means of the connecting rod 33, the pressure in the pipe 32 being reduced to permit some of this oil to be forced back into the pipe 32, and the connecting rod will again be attached to the end of the brake band by means of the pin 36. The compression chamber 31 will then be full of oil and the brake operating mechanism will then be ready to function. It is contemplated that when the piston is functioning to actuate the brakes, its face will not be forced back as far as the opening into the duct 68. Normally, its reciprocation will be limited so that no oil will be discharged through the duct 68.

It should be understood that while this invention is disclosed as applied to a crawler type of tractor yet this braking mechanism is suitable for other uses and even in its application to a tractor various modifications of the mechanism may be constructed which will yet remain within the spirit and scope of the invention as defined in the following claims.

The hydraulic control apparatus for actuating the hydraulically operated brake for steering and braking the tractor will be more fully described and will be claimed in a patent application to be filed subsequently. The application of this steering and braking mechanism to the front creeper sprocket of a crawler tractor will be more fully described and claimed in another application to be subsequently filed.

Having shown and described this invention, I claim:

1. In a vehicle having a frame and a rotatable wheel, a brake drum secured to the wheel and open on one side, an internal expanding transplit brake band carried within said drum, a dust proof cover rotatable with the drum for closing said open side and for sealing the interior of the drum apart from the surrounding atmosphere, said cover having a central opening, a non-rotatable member extending through said opening and connected securely to the frame, said cover having a dust proof bearing on said member, an axle for the wheel carried by said member, means for securing said member to the frame in a plurality of positions thereby locating the wheel in various relative positions, operating means housed with said drum for expanding the brake band into frictional engagement with the drum, and control means extending from outside the drum through said member within the central opening of the cover into the interior of the drum for controlling the brake band operating means.

2. In a brake mechanism, a rotatable wheel, a frame for carrying said rotatable wheel, a brake drum secured to the wheel and having an open side, a dust proof cover adapted to close said open side to seal the interior of the drum from the surrounding atmosphere, an expansible brake band disposed within said drum, said cover having a central opening through which extends an axle from the wheel means for sealing said opening around said axle and a band torque arm, the arm and axle being secured to said frame, means connected with said arm for retaining the brake band free from the drum when contracted, brake band expanding means housed within the drum, the torque arm being adapted to limit the rotative movement of said brake band said cover being diametrically split and provided with means for clamping its two halves together with their perimeters sealed upon the outside of the brake drum so that the cover may be split and removed readily.

3. In a brake mechanism, a rotatable wheel, a brake drum secured thereto having a closed and an open side, a frame for carrying said wheel, an expansible transplit brake and disposed within the drum, a removable dust proof cover extending over the open side of the drum to seal it from the entrance of dust, said cover having a central opening, a wheel axle and a torque member extending through said opening, brake band expanding means within the drum, means extending through said opening for operating said expanding means, means carried by said torque member for retaining said band normally free from the drum, said torque member being adapted to limit the rotation of the brake band.

4. In a vehicle, a frame, a wheel having a brake drum secured thereto slidingly and rotatably carried by said frame, and brake mechanism slidingly carried by said frame including a floating brake band mounted for circumferential and radial movements arranged to frictionally engaged said drum, a torque arm non-rotatably but slidingly secured to said frame arranged to limit the circumferential movements of said band, a piston and cylinder wholly supported on said band for expanding the same against said torque arm, a bearing for the axle of the wheel integral with said torque arm, and a flexible loop conduit one end of which is operatively connected with a cylinder and the other end is carried by the torque arm bearing assembly and movable therewith.

In witness of the foregoing I affix my signature.

GEORGE C. JETT.

CERTIFICATE OF CORRECTION.

Patent No. 1,905,231.  April 25, 1933.

GEORGE C. JETT.

It is hereby certified that error appears in the printed specification of the above numbered patent requiring correction as follows: Page 6, line 13, claim 3, for "and" read "band"; and line 32, claim 4, for "engaged" read "engage"; and that the said Letters Patent should be read with these corrections therein that the same may conform to the record of the case in the Patent Office.

Signed and sealed this 27th day of June, A. D. 1933.

M. J. Moore.

(Seal) Acting Commissioner of Patents.